(12) United States Patent
Frommer et al.

(10) Patent No.: US 8,103,416 B2
(45) Date of Patent: Jan. 24, 2012

(54) SYSTEM AND METHOD FOR DYNAMIC BRAKING A VEHICLE CLOSURE SYSTEM

(75) Inventors: Thomas P. Frommer, Mount Albert (CA); Tomasz T. Dominik, Toronto (CA)

(73) Assignee: Flextronics Automotive Inc., Ontario (CA)

( * ) Notice: Subject to any disclaimer, the term of this patent is extended or adjusted under 35 U.S.C. 154(b) by 755 days.

(21) Appl. No.: 12/230,594

(22) Filed: Sep. 2, 2008

(65) Prior Publication Data

US 2009/0222174 A1 Sep. 3, 2009

Related U.S. Application Data

(60) Provisional application No. 60/935,770, filed on Aug. 30, 2007.

(51) Int. Cl.
*G05D 1/00* (2006.01)
*G05D 3/00* (2006.01)
*B60R 22/00* (2006.01)
*E05F 15/00* (2006.01)

(52) U.S. Cl. ........................................................ 701/49
(58) Field of Classification Search .................. 701/36, 701/49; 296/146.4; 340/5.72
See application file for complete search history.

(56) References Cited

U.S. PATENT DOCUMENTS

| | | | |
|---|---|---|---|
| 5,243,735 A | 9/1993 | O'Brien | |
| 6,316,892 B1 | 11/2001 | Valencia | |
| 6,484,784 B1 | 11/2002 | Weik et al. | |
| 6,841,995 B2 | 1/2005 | Weitekamp | |
| 7,808,197 B2 * | 10/2010 | Kimura et al. | 318/469 |
| 2004/0124662 A1 | 7/2004 | Cleland et al. | |

FOREIGN PATENT DOCUMENTS

| | | |
|---|---|---|
| JP | 10246061 A | 9/1998 |
| JP | 2004106729 A | 4/2004 |

* cited by examiner

*Primary Examiner* — Khoi Tran
*Assistant Examiner* — Harry Oh
(74) *Attorney, Agent, or Firm* — Patton Boggs LLP

(57) ABSTRACT

A system for dynamic braking a vehicle closure including a drive mechanism mounted to the vehicle, the drive mechanism having contacts to receive a drive signal to cause the drive mechanism to move the vehicle closure between an open and a close position in response to the drive signal, the drive mechanism capable of generating a generated drive signal during at least a portion of the vehicle closure from the open to the close position; and a controller having electrical outputs electrically coupled to the electrical contacts of the drive mechanism and electrical inputs to provide the drive signals to the drive mechanism and to receive generated drive signals from the drive mechanism, the controller configured to provide the generated drive signals back to the drive mechanism during operation of the vehicle closure to provide dynamic braking of the vehicle closure from the open to the close position.

27 Claims, 8 Drawing Sheets

SYSTEM AND METHOD FOR DYNAMIC BRAKING A VEHICLE CLOSURE SYSTEM

RELATED APPLICATIONS

This application claims the benefit of U.S. Provisional Patent Application No. 60/935,770 filed on Aug. 30, 2007, the entire teachings of which are incorporated herein by reference.

BACKGROUND

Vehicles have become more and more automated to accommodate the desires of consumers. Vehicle parts, including windows, sun roofs, seats, sliding doors, and lift gates (e.g., rear latches and trunks) have been automated to enable users to press a button on the vehicle or on a remote control to automatically open, close, or otherwise move the vehicle parts.

When a vehicle closure system, such as a lift gate is elevated off the ground or from a closed position on a vehicle, some method is utilized to hold it up. As it is held above the ground or above a closed position of a vehicle, the mass of the lift gate under the influence of gravity equates to a substantial amount of weight and potential energy in the downward direction toward the closed position. When the closure system or lift gate is released from an open or held position, it travels downward to the closed position. Typically, sensors are employed to determine the actual position of the lift gate for determining the speed of the lift gate and whether it needs to be controlled or not in order to prevent the lift gate from slamming closed and possibly injuring the operator.

Several different types of sensors may be employed to determine the position and speed of a closing vehicle closure, such as Hall Effect sensors or optical vane interrupt sensors. One problem with the use of Hall Effect sensors or optical vane interrupt sensors is mechanical backlash due to system flex and unloaded drive mechanism conditions. As an example, when a lift gate is closing, the gate reaches a point where the weight of the lift gate begins to close the lift gate without any additional effort from the drive mechanism. In fact, at this point, the drive mechanism may apply effort to the lift gate to prevent premature closing. This is a state when negative energy is imparted from the drive mechanism to the lift gate.

The negative energy applied by the motor on the lift gate is used to control the downward velocity of the vehicle closure. For example, if a lift gate is closing too quickly, then a closed loop control algorithm instructs the controller to reduce the power applied to the motor or drive system until the desired velocity is achieved. Conversely, if the lift gate is closing too slowly, then the closed loop control algorithm instructs the controller to increase the power applied to the motor or drive system until the desired velocity is achieved. In either case, these conventional systems require additional power input into the motor to decrease or increase the closing speed of the vehicle closure.

Another problem associated with conventional lift gate closure systems is the substitution of conventional lift gate struts with power struts. Typically, conventional lift gate struts are simpler mechanical systems that require a smaller footprint or area for operation. As these are being replaced with motorized systems, such as motorized struts, the motorized struts are being designed to fit into the area or footprint typically occupied by the conventional struts. The desire to fit a motorized strut or system into the footprint or area of a conventional strut creates a size constraint for their gear train to be made as efficient as possible and their motor to be of a reduced size. Accordingly, these smaller gear trains and motors are less able to handle the forces of conventional closures apparatuses, such as lift gates, when the lift gates are accelerating closed due to gravity, thus causing the lift gates to slam closed.

SUMMARY

The above-described problems are solved and a technical advance achieved by the system and method for dynamic braking a vehicle closure system ("dynamic braking system") disclosed in this application. The present dynamic braking system controls the speed of a vehicle closure without the additional input of external power to the motor from a power source during the closing operation. Instead, the power generated from the kinetic energy of the vehicle closure during a closing operation is harnessed by the present dynamic braking system to then control the velocity of the vehicle closure during the closing operation. The present dynamic braking system captures the kinetic energy from the closing lift gate through the motor to create electrical energy to be used by the present dynamic braking system and then to utilize this energy to apply a "braking effect" to the motor without the need of additional power from the power supply.

The motor of the present dynamic braking system generates electrical energy as a result of having kinetic energy applied to it. As the closure moves, the motor is turned and electrical energy is generated. To provide for improved speed control and obstacle protection, the present dynamic braking system utilize direct sensing of the position of the lift gate and feeds that information to a controller having configurable circuitry to accommodate different vehicle closures on different systems. The present dynamic braking system provides for the generated electrical energy to be fed back into the dynamic braking system to be utilized to brake the closure's closing velocity without the need for additional energy being applied to the dynamic braking system, while providing a safe, controlled descent or closing operation. The dynamic braking system may raise and lower a vehicle closure, such as a lift gate, in accordance with user commands, typically given via a remote control device or push button. Also, the present dynamic braking system further provides improved pinch forces. Without additional power being added to the dynamic braking system, there is less energy that will be released/transferred to an object that may be being pinched by the closing of a lift gate. For example, conventional systems expose an object that is located between a lift gate and the body of a vehicle to the full force or momentum of the lift gate as the driving force is being applied by the drive system. Conversely, the present dynamic braking system only exposes an object to the reduced momentum of the lift gate as it is being operated. As there is no additional power or drive force exerted by the present dynamic braking system it regulates and reduces the momentum of the gate, and thus any pinching forces.

In one aspect, the present dynamic braking system includes a drive mechanism mounted to the vehicle, the drive mechanism having electrical contacts to receive a drive signal to cause the drive mechanism to move the vehicle closure between an open and a close position in response to the drive signal, the drive mechanism capable of generating a generated drive signal during at least a portion of the operation of the vehicle closure from the open to the close position; and a controller having electrical outputs electrically coupled to the electrical contacts of the drive mechanism and electrical inputs to provide the drive signals to the drive mechanism and to receive generated drive signals from the drive mechanism, the controller further configured to provide the generated drive signals back to the drive mechanism during operation of the vehicle closure to provide dynamic braking of the vehicle closure from the open to the close position.

In one aspect, the drive mechanism is a motor capable of generating the generated drive signals during the operation of the vehicle closure from the open to the close position. Additionally, the controller may include a circuit board having a plurality of microcontrollers for controlling the drive mechanism between one of an open position, a close position, a freewheeling operation, and the dynamic braking operation. Also, the controller may include a processor executing a software program that alters the drive signal in response to the position of the vehicle closure. The software program may be configured to determine when to apply the drive signal to the drive mechanism based on the position of the vehicle closure. Further, the software program is further configured to provide the drive signal generated by the drive mechanism back to the drive mechanism during the operation of the vehicle closure from the open to the close position.

In one embodiment, the vehicle closure is a lift gate. The dynamic braking system may include a vehicle closure position sensor mounted on the vehicle in communication with the controller for providing to the controller data relating to the closing velocity of the vehicle closure relative to the vehicle. The vehicle closure position sensor may be one of a rotary flex shaft encoder and a Hall Effect sensor.

In another aspect, the present dynamic braking system includes a method for generating a generated drive signal by a drive mechanism under mechanical force of kinetic energy from the vehicle closure during at least a portion of the operation of the vehicle closure from an open position to a close position; and feeding back the generated drive signal to the drive mechanism for dynamic braking of the vehicle closure during the at least a portion of the operation of the vehicle closure from the open position to the close position. The method may further include determining a speed of the vehicle closure relative to the vehicle. Also, the method may include feeding back the generated drive signal may include pulse width modulating the generated drive signal to the drive mechanism.

In one embodiment, the pulse width modulating the generated drive signal to the drive mechanism may further include increasing the pulse width modulation generated drive signal to increase the dynamic braking and decrease the speed of the vehicle closure. The pulse width modulating the generated drive signal to the drive mechanism may further include decreasing the pulse width modulation generated drive signal to decrease the dynamic braking and increase the speed of the vehicle closure.

In another aspect the present dynamic braking system includes a vehicle having a vehicle closure, including a vehicle body, the vehicle closure being operably mounted to the vehicle body to enable the vehicle closure to move between an open and a close position; a drive mechanism operably mounted to the vehicle and the vehicle closure, the drive mechanism having electrical contacts to receive a drive signal to cause the drive mechanism to move the vehicle closure between the open and the close position in response to the drive signal, the drive mechanism capable of generating a generated drive signal during at least a portion of the operation of the vehicle closure from the open to the close position; and a controller having electrical outputs electrically coupled to the electrical contacts of the drive mechanism and electrical inputs to provide the drive signals to the drive mechanism and to receive generated drive signals from the drive mechanism, the controller further configured to provide the generated drive signals back to the drive mechanism during operation of the vehicle closure to provide dynamic braking of the vehicle closure from the open to the close position.

In one embodiment, the drive mechanism is a motor capable of generating drive signals during the operation of the vehicle closure from the open to the close position. The controller may further include a circuit board having a plurality of microcontrollers for controlling the drive mechanism between one of an open position, a close position, a freewheeling operation, and the dynamic braking operation. Also, the controller may include a processor executing a software program that alters the generated drive signal in response to the closing velocity of the vehicle closure. The software program may be configured to determine when to apply a generated drive signal to the drive mechanism based on the closing velocity of the vehicle closure. The software program may be further configured to provide a generated drive signal generated by the drive mechanism back to the drive mechanism during the operation of the vehicle closure from the open to the close position. In another embodiment, the vehicle closure is a lift gate.

In another aspect, the present dynamic braking system includes a controller for dynamically braking a vehicle closure, including a processor configured receive a control signal representative of a closing velocity of the vehicle closure, the processor configured to receive a generated drive signal from a drive mechanism controlling the vehicle closure; software executable by the processor, the software configured to generate a pulse width modulation generated drive signal in response to the generated drive signal; and an input/output unit configured to communicate the pulse width modulation generated drive signal to the drive mechanism for providing dynamic braking to the vehicle closure.

In one embodiment, the controller may include a first microcontroller circuit operable between an on position and an off position, the first microcontroller circuit in contact with a power source for providing an opening drive signal to the drive mechanism. The controller may also include a second microcontroller circuit operable between an on position and an off position, the second microcontroller circuit in contact with the power source for providing a closing drive signal to the drive mechanism. The controller may further include a third microcontroller circuit operable between an on position and an off position, the third microcontroller circuit for providing the pulse width modulation generated drive signals. In another embodiment, the controller includes a fourth microcontroller circuit operable between an on position and an off position, the fourth microcontroller circuit in contact with the controller for providing the dynamic braking to the vehicle closure.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE DRAWINGS

Figure 1A:
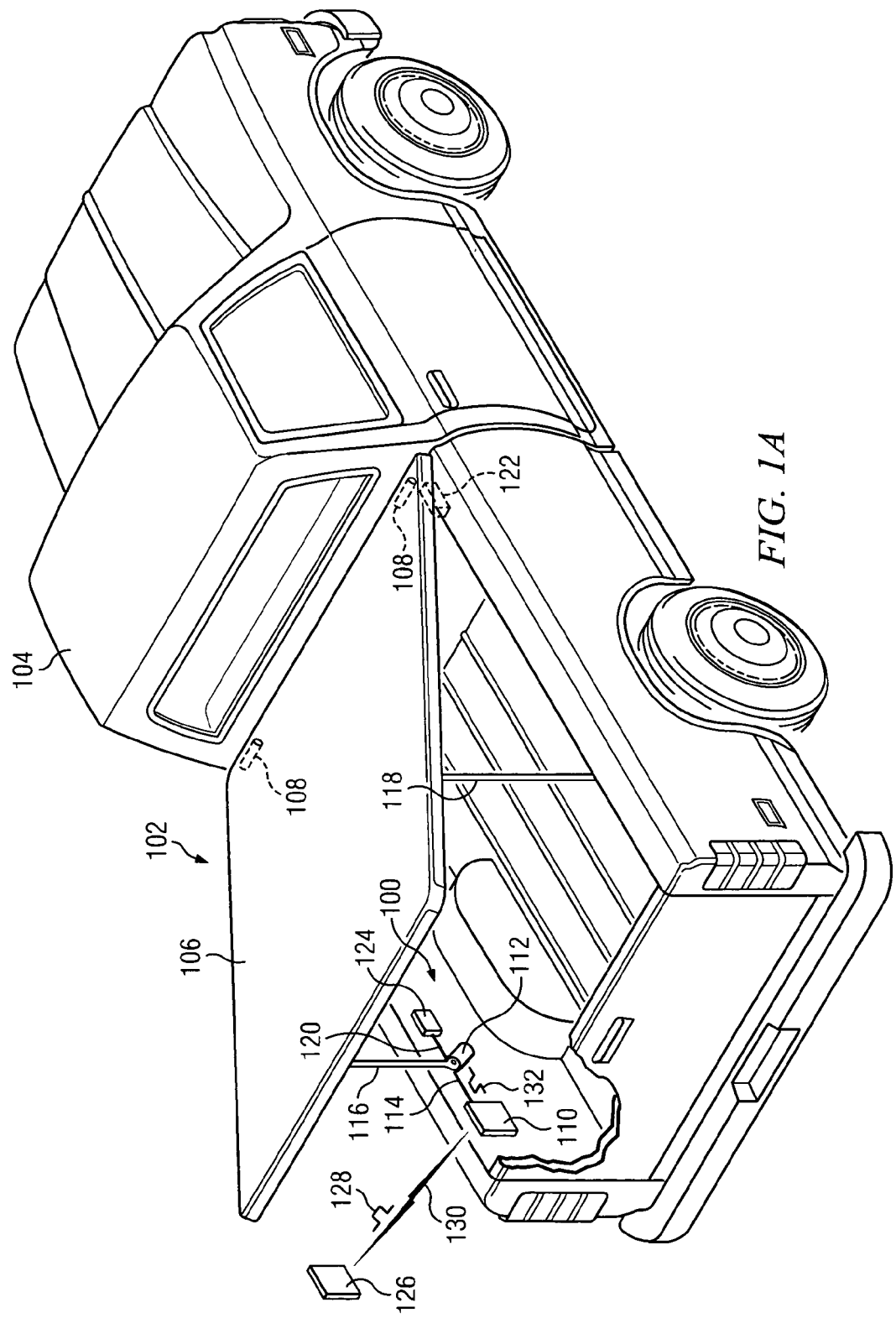
FIG. 1A is an illustration of a perspective view of a backend of a vehicle with a lift gate in an open position according to an embodiment of the present invention.
Figure 1B:
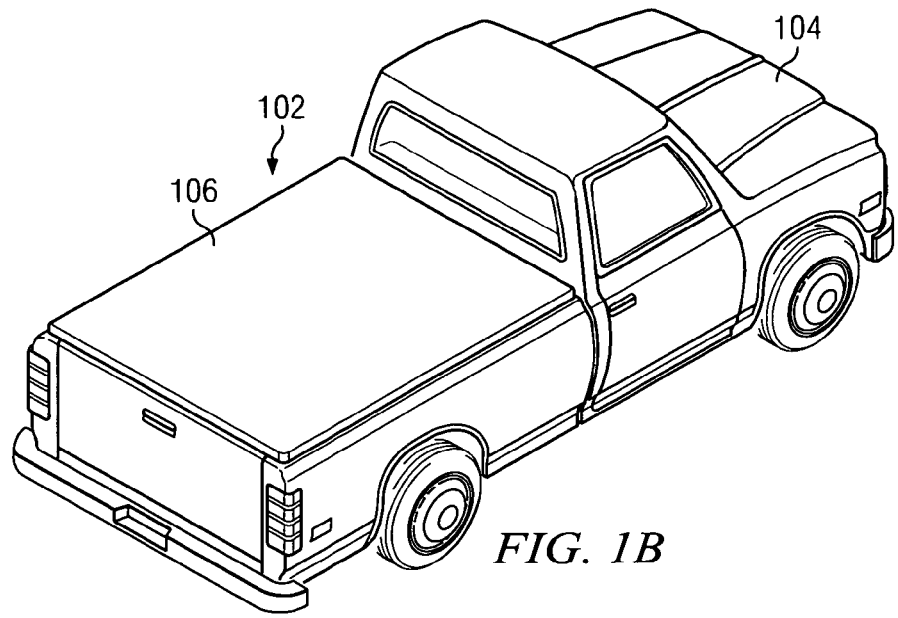
FIG. 1B is an illustration of a perspective view of a backend of the vehicle with a lift gate of FIG. 1A in a closed position according to an embodiment of the present invention.

Referring to FIGS. 1A-1D (collectively FIG. 1) are illustrations of a backend of a vehicle 102 with a vehicle closure, such as lift gate 106, in an open and closed position using the dynamic braking system 100. Vehicle 102 includes a vehicle body 104 and lift gate 106 coupled to vehicle body 104 by a hinge 108 or other mechanical fastening device or apparatus, rotatable or otherwise, that enables lift gate 106 to be opened and closed as desired. Dynamic braking system 100 further includes a controller 110 that may be mounted on vehicle 102. A drive mechanism, such as a motor 112, may be mounted on vehicle 102 and may be electrically coupled to controller 110. In one embodiment, motor 112 is mounted on vehicle 102 such that it is in direct mechanical contact with or is embodied within or a part of an actuator 116. Motor 112 may have electrical contacts or connectors 114 for being electrically in communication or contact with controller 110 to receive a drive signal for controlling operation of motor 112. Although motor 112 is shown and described in FIG. 1, it should be understood that the principles of the present invention may be applied to any drive mechanism, such as an electrical motor or electromechanical motor, which is capable of generating an electrical drive signal ("generated drive signal") during at least a portion of the closing operation of the vehicle closure. Reference to motor 112 is for exemplary purposes and constitutes one of many possible embodiments, configurations, and applications in accordance with the principles of the present invention. Additionally, while the principles of the present dynamic braking system are being described with regard to vehicle 102, it should be understood that these same principles may be applied to motors other than those used on vehicles. For example, the principles of the present dynamic braking system may be applied to motors used on boats, airplanes, buildings (e.g., automatic doors), or any other motor used for controlling operation of a mechanical device or structure. These principles may be applied to both direct current ("DC") or alternating current ("AC") motors, as well as coils where both terminals return to a microcontroller.

In one embodiment, motor 112 is capable of generating a drive signal 132 during the closing operation of lift gate 106. As further described below, motor 112 generates an drive signal 132 during at least a portion of the closing operation in response to the kinetic force of lift gate 106 being closed and transmits this drive signal from motor 112 to controller 110, which is then fed back to motor 112 to be used by motor 112 to counter the closing force of lift gate 106. In this manner, no additional drive signal is required for operating motor 112 in providing a counter force to the closing lift gate 106.

In one embodiment, dynamic braking system 100 may include an actuator 116, such as a motorized strut for raising and lowering lift gate 106. In one aspect, actuator 116 may include motor 112 and be the same unit. In another aspect, actuator 116 may be a separate unit from motor 112, in which case connectors (not shown) may connect motor 112 to actuator 116. Motor 112 and/or actuator 116 are in communication with controller 110 via connectors 114. Actuator 116 may provide linear and/or non-linear motion control of lift gate 106 for opening and closing lift gate 106 during operation of dynamic braking system 100. In addition, dynamic braking system 100 may further include a gas spring or strut 118 (not shown in FIG. 1C) to provide additional mechanical energy or force for opening and closing lift gate 106. In one aspect, actuator 116 or dynamic braking system 100 may provide variable speed control for the opening and closing operations of lift gate 106. Gas spring 118 may be mounted between the vehicle body 104 and lift gate 106, for example.

Dynamic braking system 100 may further include a vehicle closure position sensor to determine the distance between lift gate 106 and vehicle body 104 during opening and closing operations. Any of several types of these vehicle closure position sensors may be employed. For example, in one embodiment, a rotary flex shaft encoder 122 may be mounted to hinge 108 for determining the distance between lift gate 106 and vehicle body 104. As lift gate 106 opens or closes, hinge 108 rotates, thereby causing rotary flex shaft encoder 122 to rotate and generate a digital pulse or pulse width modulation ("PWM") signal. Rotary flex shaft encoder 122 may be electrically coupled to controller 110 and the signals produced by rotary flex shaft encoder 122 in response to lift gate 106 opening and/or closing may be communicated to controller 110. In one embodiment, rotary flex shaft encoder 122, may be mounted to vehicle body 104 (e.g., lift gate 106 and/or hinge 108) of vehicle 102. Although FIG. 1 shows and describes a lift gate 106, it should be understood that the principles of the present dynamic braking system 100 applies to vehicle closure or any closure system, such as rotational closure systems, trunks, lift gates, tailgates, tonneau covers, engine covers, hospital beds, tanning bed covers, compartment doors, dump beds, and the like. Reference to lift gate 106 is for exemplary purposes and constitutes one of many possible embodiments, configurations, and applications in accordance with the principles of the present dynamic braking system 100. In addition, rotary flex shaft encoder 122 may also be located at another position on vehicle body 104, such as coupled to lift gate 106 away from hinge 108. Also, it should be understood that any type of angle sensor may be positioned and employed by dynamic braking system 100, such as an analog angle sensor.

In another embodiment, a Hall effect sensor 124 may be used to determine the distance between lift gate 106 and vehicle body 104. Hall effect sensor 124 may be mounted on motor 112, a mechanical drive train associated with actuator 116 and/or motor 112, or is located in another location on vehicle 102. Signals from Hall effect sensor 124 are generated by the opening and/or closing of lift gate 106 relative to vehicle body 104 of dynamic braking system 100. Hall effect sensor 124 determines the position and/or speed of lift gate 106 relative to vehicle body 104. Hall effect sensor 124 may be in communication with controller 110 via connectors 120 and signals produced in response to lift gate 106 opening and/or closing may be communicated to controller 110 via connectors 120. Additionally, Hall effect sensor 124 may be used to detect a change in velocity and to allow for speed control and obstacle detection.

Dynamic braking system 100 may further include a remote keyless entry ("RKE") transponder/keyfob 126 for transmitting wireless signals 130, such as radio frequency or infra-red radiation signals, to controller 110 for opening and closing lift gate 106. Additionally, transponder/keyfob 126 may transmit authorization codes 128 for accessing one particular dynamic braking system 100 in a particular vehicle 102 over another as is in known in the art. Controller 110 may include a RKE antenna (not shown), for providing functionality to transponder/keyfob 126. When a button is pressed on transponder/keyfob 126, the appropriate message (i.e. "open liftgate" or "close liftgate") is sent from transponder/keyfob 126 via UHF RF signals, for example, where it is received by controller 110 at vehicle 102. Controller 110 may receive this information and in turn transmit a message across connectors 114 instructing actuator 116 and motor 112 to react accordingly. Dynamic braking system 100 further includes drive signals and control signals (collectively or separately 132) that are communicated via connectors 114 between controller 110 and motor 112 for controlling motor 112.

Figure 1C:
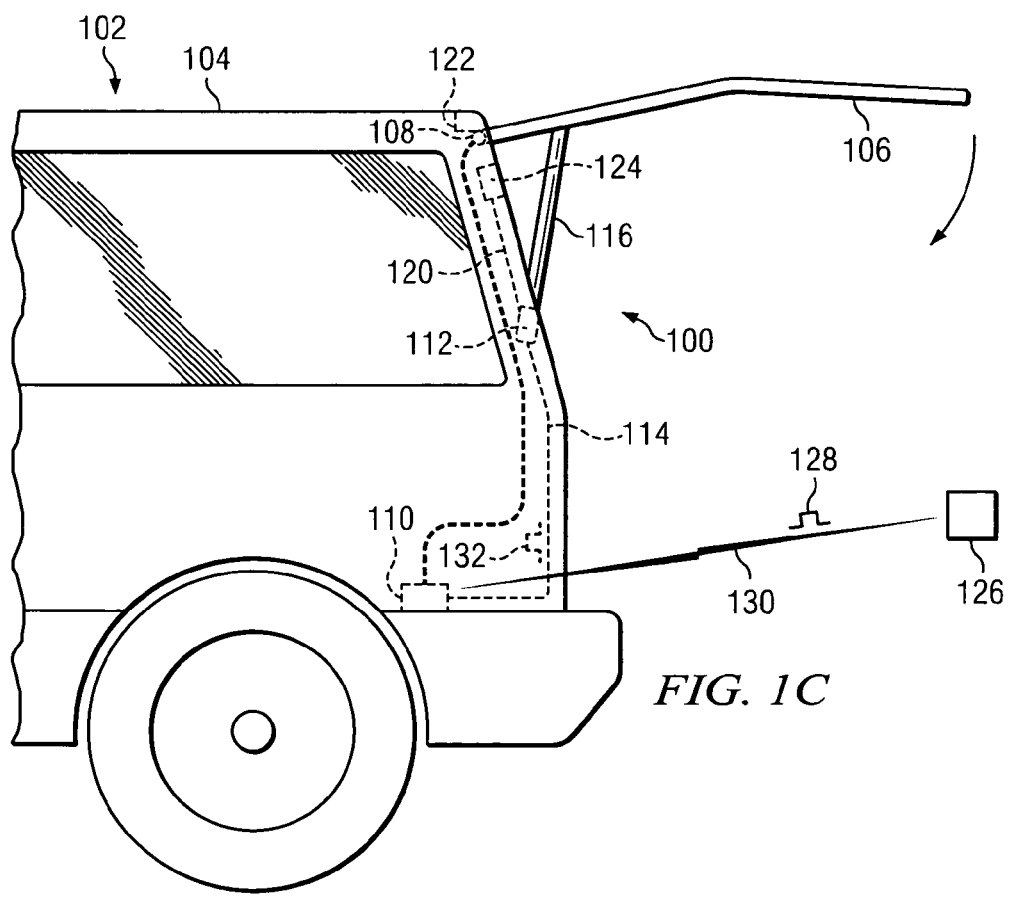
FIG. 1C is an illustration of a side view of a backend of a vehicle with a lift gate in an open position according to another embodiment of the present invention.
Figure 1D:
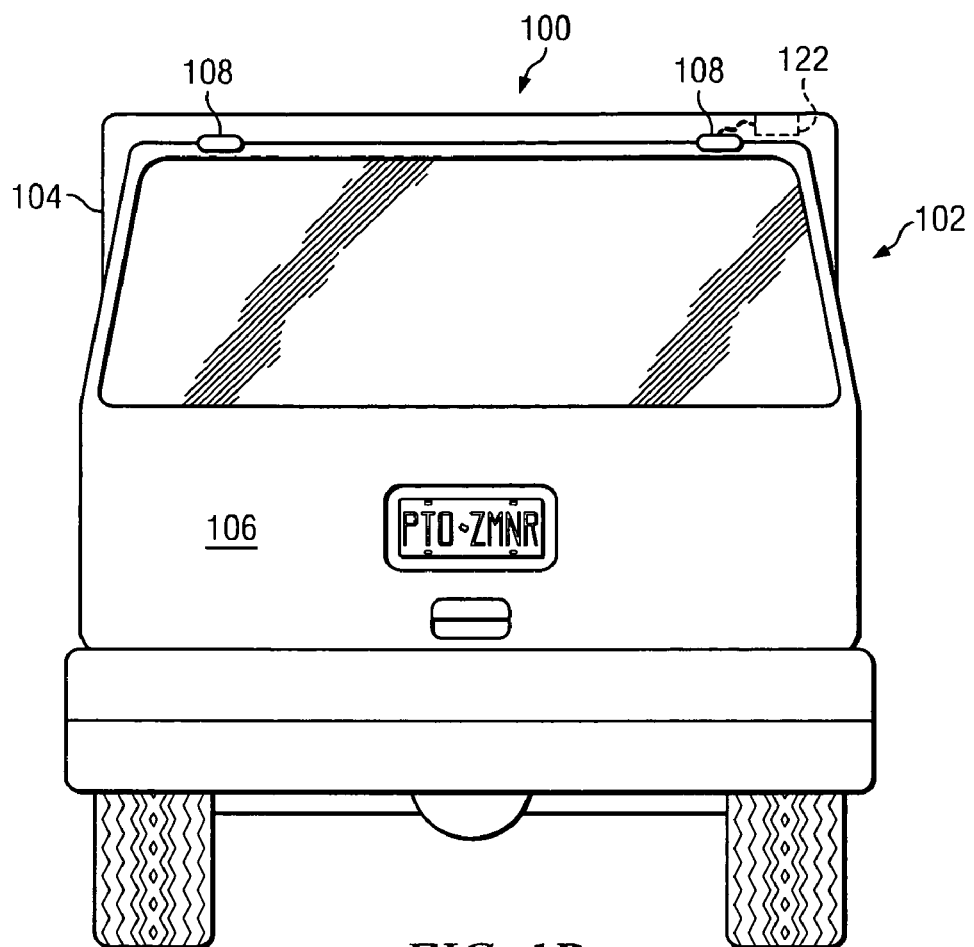
FIG. 1D is an illustration of a backend of the vehicle with a lift gate of FIG. 1C in a closed position according to another embodiment of the present invention.
Figure 2:
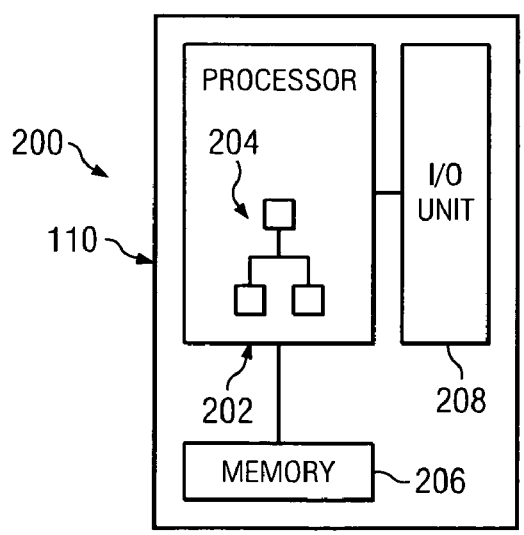
FIG. 2 is a block diagram of an exemplary controller having a processor executing software for driving a closure system according to an embodiment of the present invention.

FIG. 2 is an embodiment 200 of a block diagram of an exemplary controller 110 having a processor 202 executing software 204. Processor 202 may be in communication with a memory 206 for storing information, such as a program, software 204, and/or data used by the program or software 204, for example, and an input/output (I/O) unit 208. In one embodiment, encoder rotary flex shaft 122 may generate an angle signal having a PWM form and/or Hall effect sensor 124 may generate a signal relating to the distance between lift gate 106 and vehicle body 104. I/O unit 208 may receive the signal and communicate it to processor 202 for processing via software 204, for example. In the instance of the rotary flex shaft encoder 122, the signal may be a digital PWM signal. In addition, controller 110, software 204 and/or processor 202 may generate a drive signal and a compensation signal based on the angle signal or distance signal to be utilized to alter the drive signal for controlling velocity and sensing obstacles during movement of lift gate 106 utilizing a position, velocity, acceleration, and/or force controller, as further described below. I/O unit 208 may be part of the processor 202 itself or be separate electronic components configured to drive motor 112 to drive lift gate 106 (FIG. 1) to a desired position.

Figure 3:
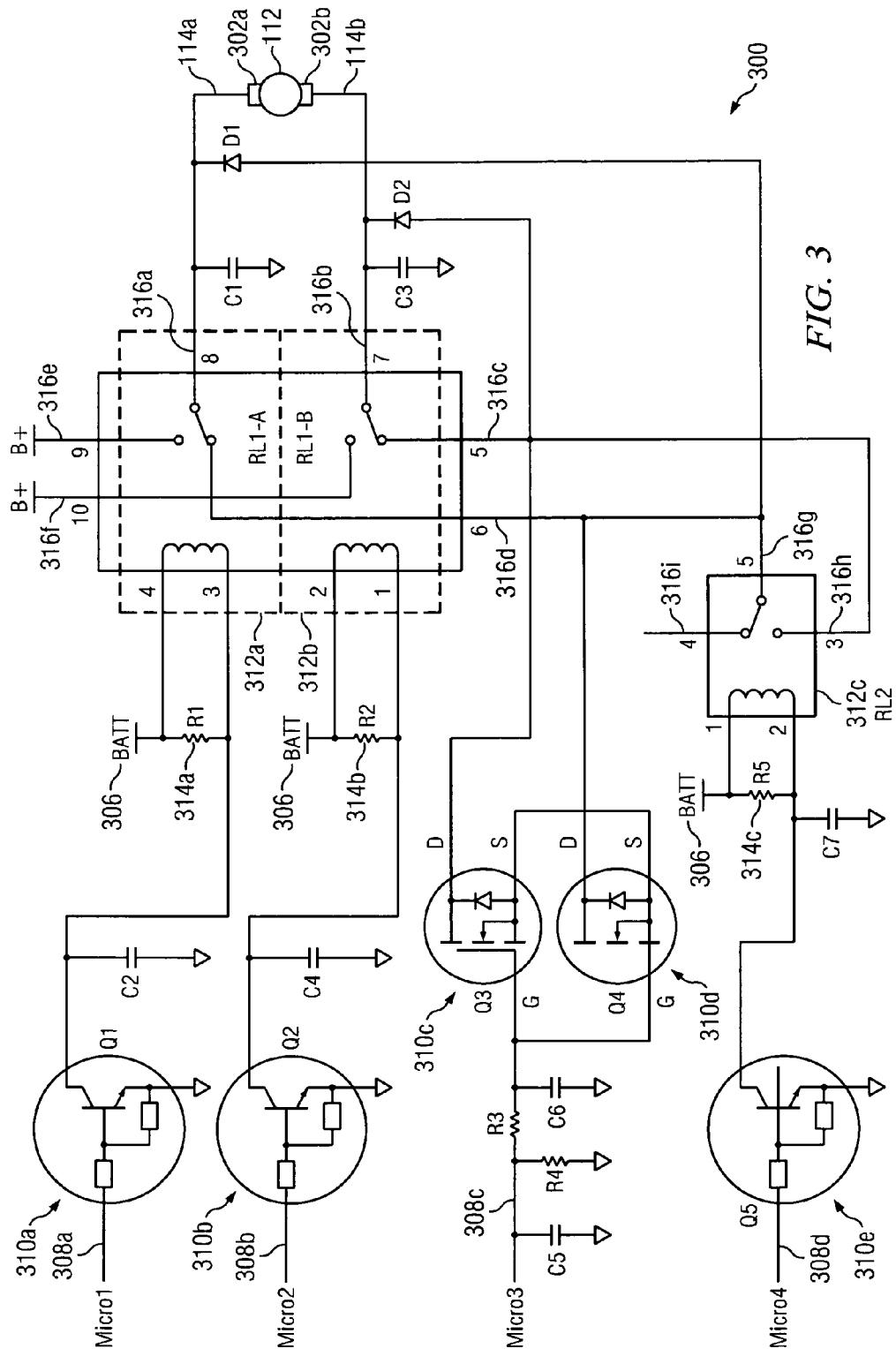
FIG. 3 is a schematic diagram of a control circuit according to an embodiment of the present invention.

Controller 110 may further include circuitry for dynamic braking of a vehicle closure. FIG. 3 illustrates an embodiment 300 of a schematic of an exemplary circuit for dynamic braking of a vehicle closure. Circuitry 300 may be configured to drive motor 112 in a forward direction, drive motor 112 in a reverse direction, enable the motor 112 to freewheel when not being powered by the dynamic braking system, and/or provide dynamic braking to motor 112.

Referring to FIGS. 1A, 1C, and 3, motor 112 may include a first terminal 302a and a second terminal 302b (collectively 302) for enabling voltages to be applied for controlling speed and direction of motor 112. A first connector 114a and a second connector 114b (collectively 114) are electrically connected to the first terminal 302a and second terminal 302b, respectively, and circuitry 300 of controller 110. In terms of being "at the motor," any circuitry or electrical device connected to either of the connectors 114 and/or terminals 302, themselves, or motor 112 itself is considered to be at the motor.

Software 204 executed by controller 110 may also include software that operates in conjunction with circuitry 300. A controller bus (not shown) may be connected between controller 110 and circuitry 300 to enable communication of drive signals and/or control signals 132 between controller 110, circuitry 300, and/or motor 112. One or more control signals 132 may include one or more signals to turn on and off switches controlled within controller 110. It should be understood that control signals 132 may be digital or analog in accordance with the controller 110 and circuitry 300. In one embodiment, controller 110 may include analog input ports. Alternatively, an analog-to-digital ("A/D") conversion device (not shown) may be utilized in conjunction with controller 110. Still yet, circuitry 300 may include an A/D conversion device to communicate over the controller bus, for example.

To power dynamic braking system 100, including controller 110 and motor 112, a battery or power supply 306 of vehicle 102 may be connected to one or more components of dynamic braking system 100. In normal operation, power supply 306 is utilized to power (i.e., enable and disable) motor 112 as understood in the art. Consistent with FIG. 2, the circuitry 300 is connected to motor 112 via the connectors 114.

In one embodiment, circuitry 300 of dynamic braking system 100 includes a first microcontroller port 308a, a second microcontroller port 308b, a third microcontroller port 308c, and a fourth microcontroller port 308d (collectively 308). Circuitry 300 of dynamic braking system 100 may further include first transistor 310a, second transistor 310b, first metal-oxide-semiconductor field-effect transistor ("MOSFET") 310c, second MOSFET 310d, and third transistor 310e (collectively 310). Further, circuitry 300 of dynamic braking system 100 may also include first relay 312a, second relay 312b, and third relay 312c (collectively 312). The relays 312 may be any type of relays 312 commonly know in the art. They may be controlled by an analog or digital output from controller 110.

Circuitry 300 of dynamic braking system 100 may also include first resistor 314a, second resistor 314b, and third resistor 314c (collectively 314). In one embodiment, first relay 312a and second relay 312b are in communication with pin 316a, pin 316b, pin 316c, pin 316d, pin 316e, and pin 316f (collectively 316); and third relay 312c is in communication with pin 316g, pin 316h, and pin 316i (collectively 316). As described above, dynamic braking system 100 provides forward direction, reverse direction, freewheeling, and dynamic braking functionality for opening and closing lift gate 106 of vehicle 102. By switching through these different modes during operation, dynamic braking system 100 provides enhanced speed control and obstacle detection to the operation of lift gate 106 by reducing reaction time and managing efficiently and effectively the energy within the present dynamic braking system 100.

First microcontroller port 308a may drive motor 112 in a first or forward direction by turning on first transistor 310a which energizes a coil of first relay 312a to activate first relay 312a. This connects a pin 316a to power supply 306 through pin 316e. Software 204 in controller 110 causes second microcontroller port 308b to shut off, thus causing second transistor 310b and second relay 312b to be deactivated. In this embodiment, fourth microcontroller port 308d is turned on that activates third relay 312c, thus connecting pin 316g of third relay 312c to pin 316h of third relay 312c. In one aspect, third microcontroller port 308c pulse width modulates first MOSFET 310*c* and second MOSFET 310*d* to control the speed of motor 112. This causes motor 112 to operate in a first or forward direction, thus moving lift gate 106 in a first or forward position to an open position as shown in FIGS. 1A and 1C.

With further reference to FIG. 3 and as discussed above, dynamic braking system 100 also provides control of lift gate 106 in a second or reverse direction. In this aspect, first microcontroller port 308*a* is shut off, and as a result first transistor 310*a* and first relay 312*a* are deactivated. Second microcontroller port 308*b* is activated, which turns on second transistor 310*b* that energizes the coil of second relay 312*b*, thus activating second relay 312*b*. This action causes pin 316*b* of second relay 312*b* to connect to power supply 306 through pin 316*f*. Fourth microcontroller port 308*d* is turned on, which activates third relay 312*c*, thus connecting pin 316*g* of third relay 312*c* to pin 316*h* of third relay 312*c*. Third microcontroller port 308*c* pulse width modulates first MOSFET 310*c* and second MOSFET 310*d* to control the speed of motor 112. In either direction, opening or closing, MOSFETs 310C and/or 310D operate to in part drive the circuit for opening or closing lift gate 106, as further described herein.

With continuing reference to FIG. 3, dynamic braking system 100 may further provide freewheeling functionality to motor 112 for manually operating lift gate 106 by a user if desired. Generally, freewheeling is the ability for motor 112 to turn freely when not being powered or energized by dynamic braking system 100. This may be desirable in operations when a manual mode is required or wanted in addition to a powered lift gate 106. In this aspect, dynamic braking system 100 does not provide power to circuitry 300, thus microcontroller ports 308 are shut off, and as a result first transistor 310*a*, second transistor 310*b*, first MOSFET 310*c*, second MOSFET 310*d*, and relays 312 are deactivated. This then enables lift gate 106 to be manually operated without power being supplied to motor 112.

As described above, dynamic braking system 100 further provides a dynamic braking to motor 112. Dynamic braking harnesses the energy generated by opening and/or closing lift gate 106 of vehicle 102 and uses it to apply a braking force by dynamic braking system 100 to slow it down without the addition of power to motor 112. In one aspect, first microcontroller port 308*a*, second microcontroller port 308*b*, and fourth microcontroller port 308*d* are turned off such that first transistor 310*a*, second transistor 310*b*, third transistor 310*e*, and relays 312 are deactivated. To harness the energy generated by motor 112 operating lift gate 106 in a closing operation, third microcontroller port 308*c* pulse width modulates first MOSFET 310*c* and second MOSFET 310*d* to provide the desired speed control of lift gate 106. Depending on the direction of travel of lift gate 106, forward or reverse, only one of first MOSFET 310*c* or second MOSFET 310*d* works toward providing speed control while the other of first MOSFET 310*c* and second MOSFET 310*d* acts as a diode. Circuitry 300 may further include additional functionality, such as filtering, clamping, and debouncing functionality typically found in circuit design. In one embodiment, motor 112 when driven becomes a generator and by shunting the energy back to motor 112 it provides a negative energy back to itself canceling out the energy generated. Controller 110 controls how much of the energy is shunted back to motor 112 by PWM. Further, controller 110 manipulates and manages the energy it receives from the dynamic braking, but controller 110 itself is powered by the power supply 306 of the vehicle 102.

The configuration of circuitry 300 enables dynamic braking at motor 112, as further described herein. It should be understood that alternative embodiments of circuitry 300 may be utilized to perform the same or functional equivalent testing of circuitry 300 of motor 112. Still yet, alternative electrical components may be utilized and/or different values of the electrical components may be used in accordance with the principles of the present dynamic braking system.

Figure 4:
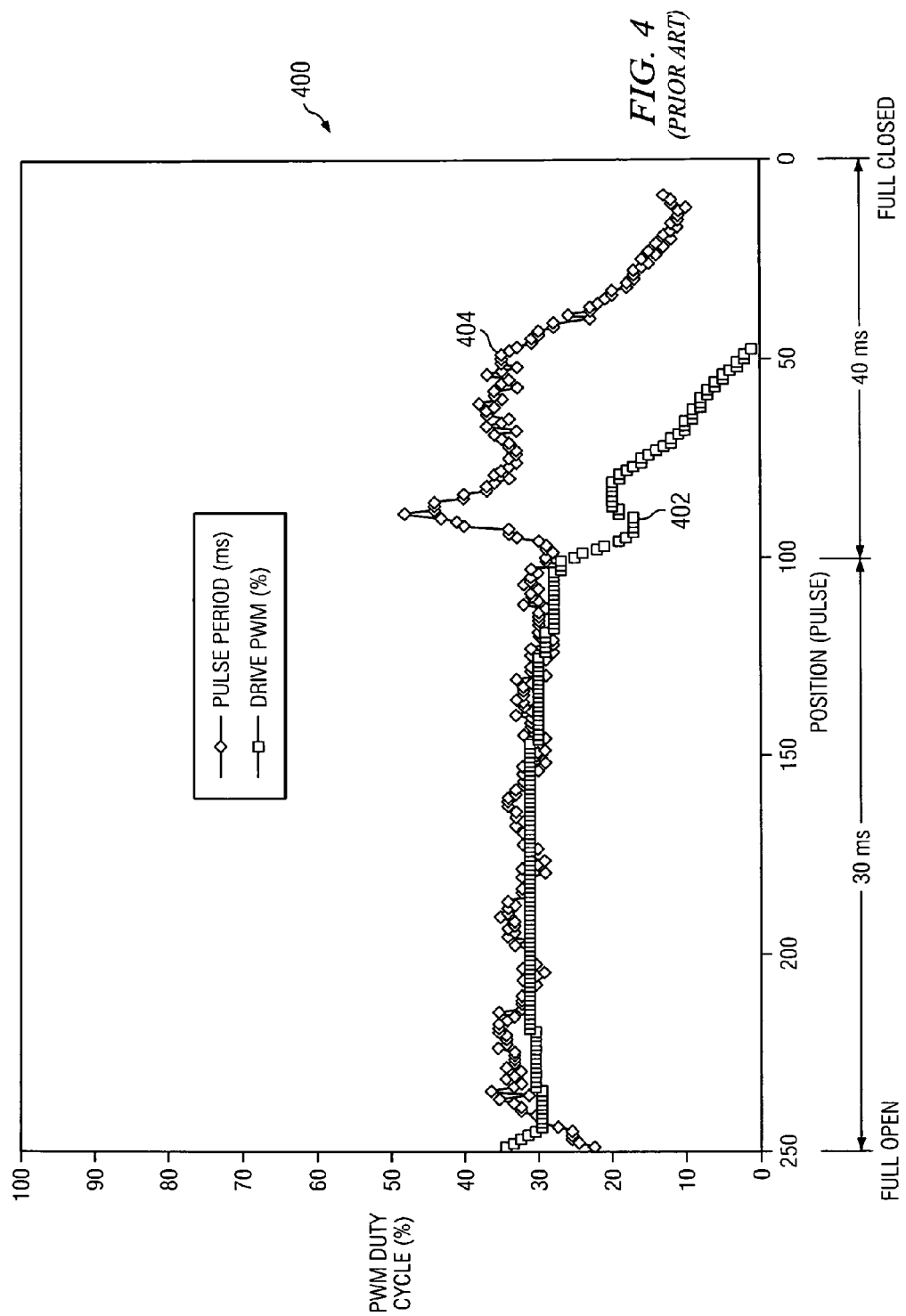
FIG. 4 illustrates a graph of Hall Pulse Period and PWM duty cycle versus position of a conventional control system attempting to control with constant speed the closing of a gate without dynamic braking.
Figure 5:
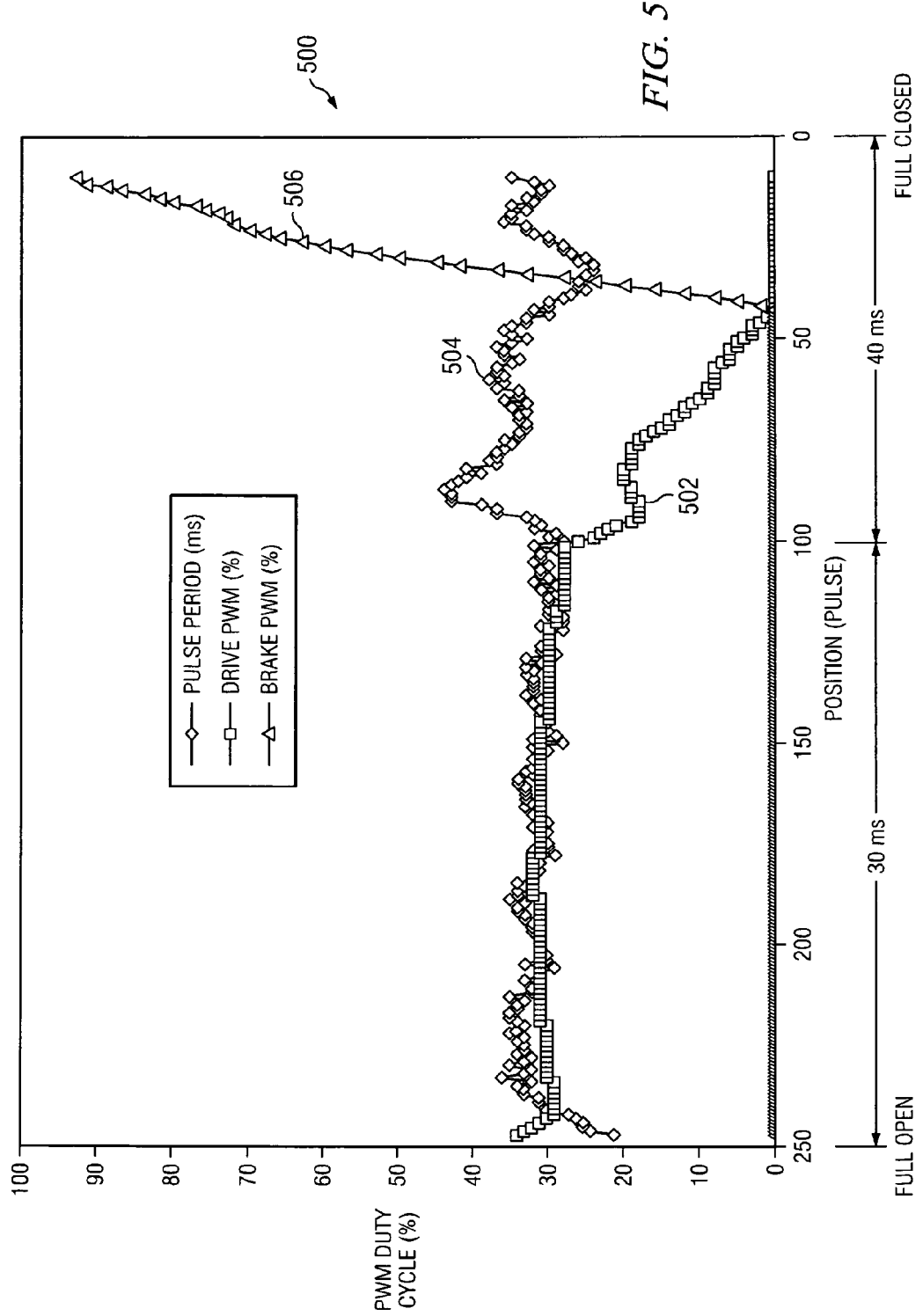
FIG. 5 illustrates a graph of Hall Pulse Period and PWM duty cycle versus position with dynamic braking according to an embodiment of the present invention.

Generally, the period of the pulse has an inverse relation to the velocity of lift gate 106; the greater the pulse period, the slower lift gate 106 is traveling or moving. For example, two different ranges of pulse periods, 0 to 100 and 100 to 250, may be used. In this example, between pulse position 250 and dynamic braking system 100, the set point may be 30 milliseconds ("ms") and between the pulse position 100 and pulse position 0, the set point may be 40 ms. To show the differences between conventional control systems and the present dynamic braking system, FIG. 4 illustrates a graph 400 of a conventional system controlling the closing of a gate and FIG. 5 illustrates a graph 500 of the present dynamic braking system controlling the closing of gate, such as lift gate 106. FIG. 4 illustrates a graph 400 of a Hall Pulse Period & PWM duty cycle versus position in a situation where a conventional control system does not apply dynamic braking to a motor. As a gate transitions from fully open (pulse position 250) to closed (pulse position 0), a control unit adjusts the drive PWM signals 402 in an attempt to keep a gate closing at a constant speed as shown by pulse period 404. In the first region of travel (250-100), a conventional control system strives to maintain a pulse period of 30 ms, for example. Once entering the second region of travel (100-0), the travel dynamics of the gate change as gravity assists the gate closure, and a conventional control system has a hard time maintaining a pulse period of 40 ms. The drive PWM signals 402 adjusts to maintain a pulse period of 40 ms, but as the gate begins to close rapidly due to gravity, a conventional braking system cannot adapt fast enough and the gate slams closed.

FIG. 5 illustrates a graph 500 of the present dynamic braking system controlling the closing of gate dynamically, such as lift gate 106. As lift gate 106 transitions from fully open (pulse position 250) to closed (pulse position 0), controller 110 adjusts the drive PWM signals 502 to keep lift gate 106 closing at a constant speed as shown by pulse period 504. In the first region of travel (250-100), dynamic braking system 100 maintains a pulse period of approximately 30 ms, for example. Once entering the second region of travel (100-0), the travel dynamics of lift gate 106 changes as gravity assists the lift gate 106 closure. As can be seen in FIGS. 4 and 5, there is little differences for the first approximate 200 pulses of travel between the conventional system of FIG. 4 and dynamic braking system 100 as shown in FIG. 5. For the first approximate 200 pulses dynamic braking by, the present dynamic braking system 100 has not been activated. In one embodiment, at an approximate pulse period of 50, dynamic braking system 100 is engaged, as shown by brake PWM signal 506. During this time there is no additional power added to motor 112 by controller 110, as seen by drive PWM signals 502. Dynamic braking system 100 uses the generated drive signals generated by motor 112 under mechanical force from kinetic energy by lift gate 106 during its fall or closing operation and feeds it back into dynamic braking system 100 to slow itself down. As a result, controller 110 is closer to maintaining its target pulse period of 40 ms and lift gate 106 does not slam closed. Additionally, the present dynamic braking system 100 may support the opening of lift gate 106 as well.

Figure 6:
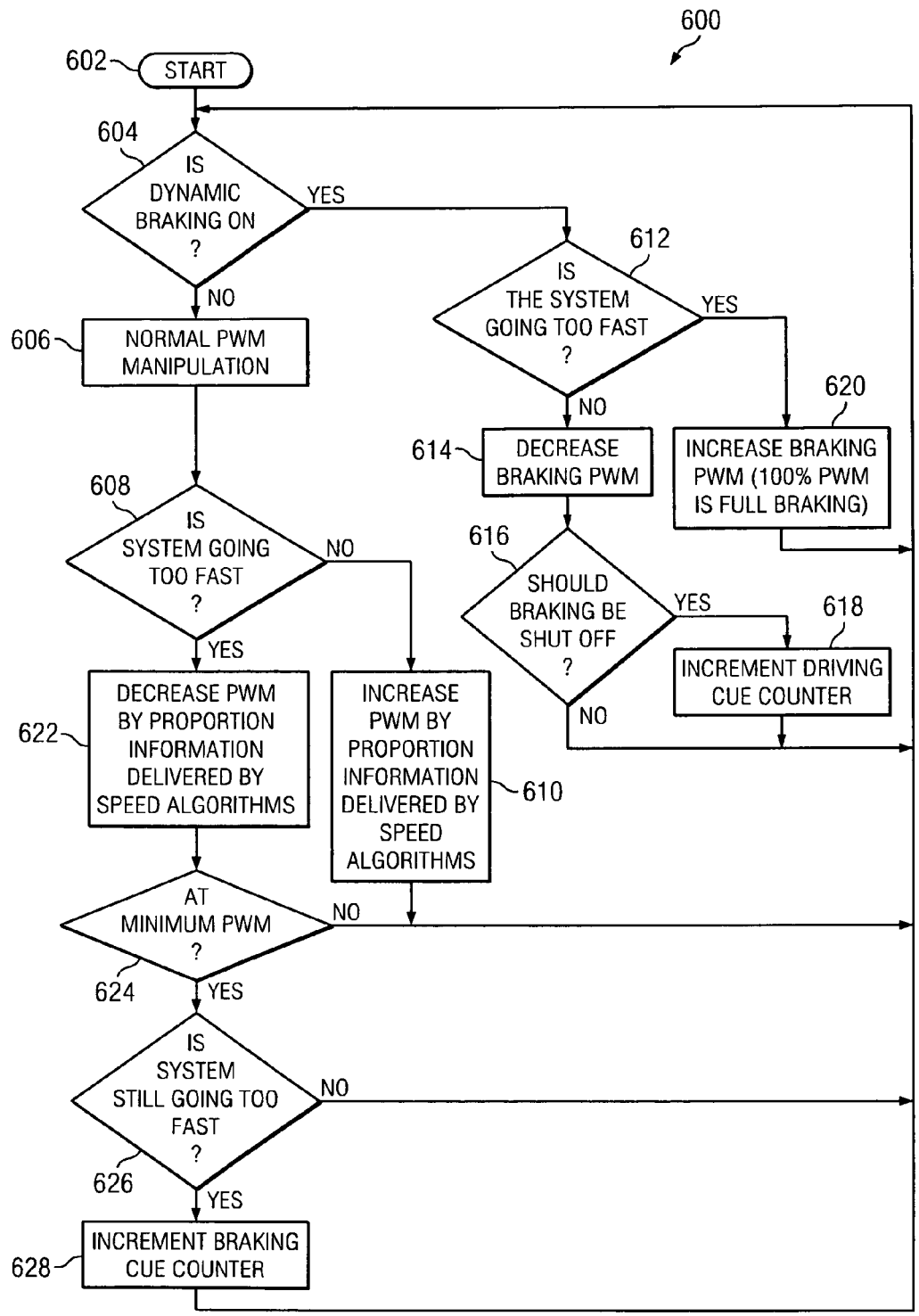
FIG. 6 illustrates a flow diagram for an exemplary process for controlling a PWM signal for driving and braking a motor of a vehicle closure according to an embodiment of the present invention.

In addition to the aforementioned aspects and embodiments of the present dynamic braking system 100, the present dynamic braking system further includes methods for dynamically braking the closing of a vehicle closure, such as lift gate 106. FIG. 6 illustrates a flow diagram of an embodiment 600 of one such process. Process 600 describes how PWM is controlled by controller 110, software 204, and/or circuitry 300 to drive and dynamically brake lift gate 106 during closure. The control process 600 starts at step 602. At step 604, an inquiry is made whether dynamic braking is already being provided by controller 110, software 204, and/or circuitry 300. If the answer to this inquiry is "no," then at step 606 controller 110, software 204, and/or circuitry 300 of dynamic braking system 100 control motor 112 by PWM as described herein. This step may include controller 110, software 204, circuitry 300, and/or power supply 306 providing a conventional PWM signal to motor 112.

At step 608, an inquiry is made whether lift gate 106 is being closed too quickly. If the answer to this inquiry is "no," then at step 610 controller 110, software 204, circuitry 300, and/or power supply 306 of dynamic braking system 100 increase the PWM signal by proportion based on information received by controller 110, software 204, and/or circuitry 300. In one embodiment, at step 608, dynamic braking system 100 may determine whether lift gate 106 is being closed too quickly by receiving data regarding the speed and/or position of lift gate 106 through rotary flex shaft encoder 122 and/or Hall effect sensor 124. For example, an angle signal having a PWM or analog form with a duty cycle based on the angle of lift gate 106 may be generated at step 608. The angle signal may be fedback to controller 110 at step 608. Additionally, controller 110 may utilize a position and/or speed control algorithm as understood in the art.

If the answer of the inquiry at step 604 is "yes," then dynamic braking system 100 makes another inquiry whether the closing rate of lift gate 106 is too fast. If the answer to this inquiry is "no," then at step 614 controller 110, software 204, and/or circuitry 300 of dynamic braking system 100 decrease the braking PWM signal supplied to motor 112. At step 616, an inquiry is made whether dynamic braking should be turned off. If the answer to this inquiry is "yes," then at step 618 a driving cue counter is incremented. A braking cue counter may reside in software 204 that may provide a delay that provides software 204 enough time to determine if regular speed control is not capable of controlling the speed of lift gate 106 during closing or opening. For example, if the counter reaches a certain level, then the dynamic braking is turned on. Similarly, a driving cue counter of the dynamic braking system 100 no longer may determine if dynamic braking is no longer needed, thus transitioning back to regular speed control.

If the answer to the inquiry at step 612 is "yes," then at step 620 dynamic braking system 100 increases the braking PWM signal, such as increasing the PWM to dynamic braking system up to 100%, full braking. Referring back to step 608, if the answer to the inquiry is "yes," then at step 622 dynamic braking system 100 decreases the PWM signal by proportion based on information delivered by the speed algorithms of dynamic braking system 100, rotary flex shaft encoder 122 and/or Hall effect sensor 124. At step 624, an inquiry is made whether the PWM signal is at the minimum range or setting. If the answer to this inquiry is "yes," then another inquiry is made at step 626 whether lift gate 106 is still closing too fast. If the answer to both steps 624 and 626 are "no," then the process 600 returns to step 604. If the answer to the inquiry at step 626 is "yes," then at step 628 the braking cue counter is incremented.

Figure 7:
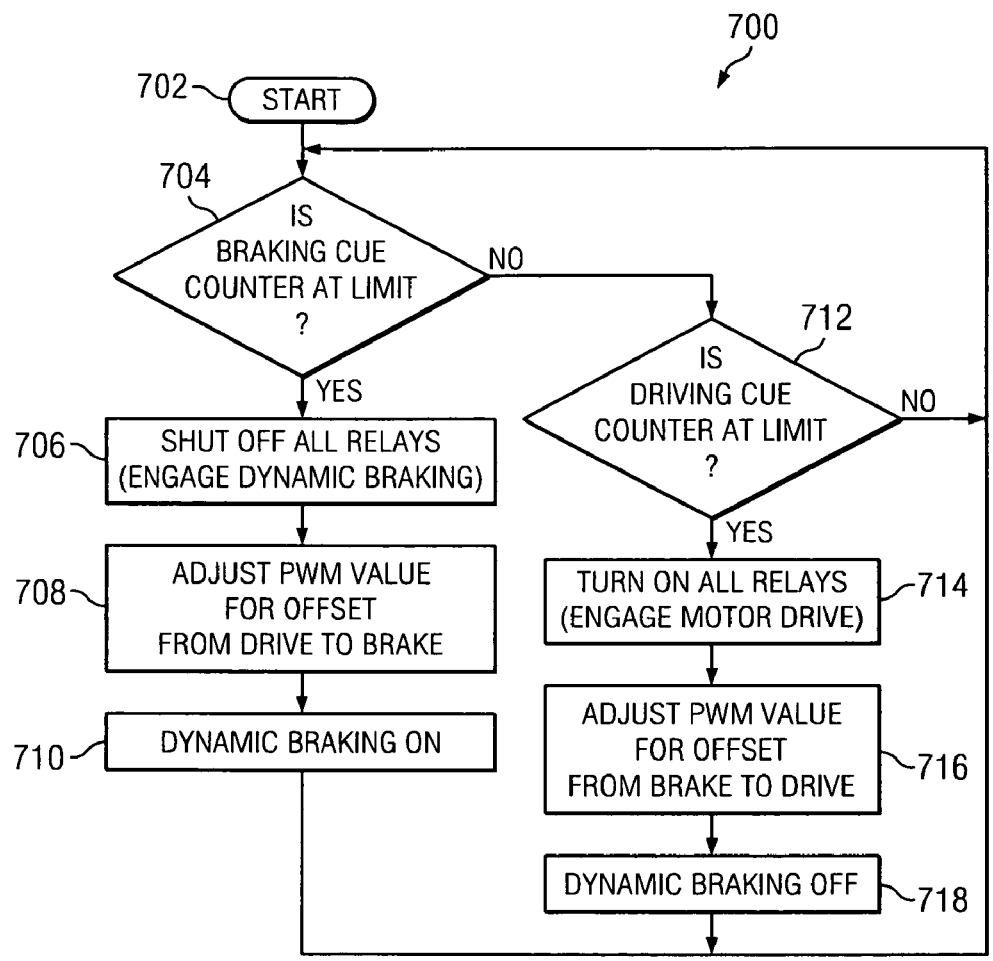
FIG. 7 illustrates a flow diagram for an exemplary process for controlling a PWM signal for driving and braking a motor of a vehicle closure according to another embodiment of the present invention.

In addition to the process 600 described above, dynamic braking system 100 further includes a process for checking the status of the dynamic braking and turning the dynamic braking on or off. FIG. 7 illustrates a flow diagram of an embodiment 700 of one such process. The process 700 starts at step 702. At step 704, an inquiry is made whether the braking cue counter is at its limit. If the answer to this inquiry is yes, then at step 706 all relays, such as relays 312 are turned off or deactivated, thus initiating or engaging dynamic braking of motor 112. At step 708, dynamic braking system 100 adjusts the PWM value for offsetting a drive signal to a braking signal. At step 710, dynamic braking of motor 112 is performed.

Returning to step 704, if the answer to this inquiry is "no," then at step 712 an inquiry is made whether the driving signal cue counter is at its limit. If the answer to this inquiry is "yes," then at step 714 dynamic braking system 100 turns on relays 312 to engage motor 112 in a forward or reverse direction. At step 716, the value of the PWM signal is adjusted for offset from a braking operation to a drive operation. At step 718, the dynamic braking by dynamic braking system 100 is turned off or deactivated.

In addition to these steps above, the present dynamic braking system may further inquire as to whether a latch for maintaining the lift gate is closed. If the latch is not closed, then controller 110, software 204, and/or circuitry 300 may run a procedure to close the lift gate. If it was determined at that the latch is closed, then the controller 110, software 204, and/or circuitry 300 may begin an open lift gate procedure as described above.

Further, in addition to the steps above, the present dynamic braking system may further inquire whether the speed or velocity of lift gate 106 is less than an obstacle threshold. If the speed of lift gate 106 is less than the obstacle threshold, then an obstacle is detected to be obstructing movement of lift gate 106. The lift gate may be released to a manual control, and motor 112 moving lift gate 106 may be stopped or reversed to avoid damage to the obstacle, injury to a person, or damage to the lift gate or its drive system.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A system for dynamically braking a vehicle closure of a vehicle, comprising:
   a drive mechanism mounted to the vehicle, the drive mechanism having electrical contacts to receive a drive signal to cause the drive mechanism to move the vehicle closure between an open and a closed position in response to the drive signal, the drive mechanism capable of generating a generated drive signal during at least a portion of the operation of the vehicle closure from the open to the close position; and
   a controller having electrical outputs electrically coupled to the electrical contacts of the drive mechanism and electrical inputs to provide the drive signals to the drive mechanism and to receive generated drive signals from the drive mechanism, the controller further configured to provide the generated drive signals back to the drive mechanism during operation of the vehicle closure to provide dynamic braking of the vehicle closure from the open to the close position.

2. The system for dynamically braking a vehicle closure according to claim 1, wherein the drive mechanism is a motor capable of generating the generated drive signals during the operation of the vehicle closure from the open to the close position.

3. The system for dynamically braking a vehicle closure according to claim 1, wherein the controller further comprises:
a circuit board having a plurality of microcontrollers for controlling the drive mechanism between one of an open position, a close position, a freewheeling operation, and the dynamic braking operation.

4. The system for dynamically braking a vehicle closure according to claim 1, wherein the controller further comprises:
a processor executing a software program that alters the drive signal in response to the position of the vehicle closure.

5. The system for dynamically braking a vehicle closure according to claim 4, wherein the software program is configured to determine when to apply the drive signal to the drive mechanism based on one of speed and position of the vehicle closure.

6. The system for dynamically braking a vehicle closure according to claim 4, wherein the software program is further configured to provide the drive signal generated by the drive mechanism back to the drive mechanism during the operation of the vehicle closure from the open to the close position.

7. The system for dynamically braking a vehicle closure according to claim 1, further comprising:
a vehicle closure position sensor mounted on the vehicle in communication with the controller for providing to the controller data relating to the closing velocity of the vehicle closure relative to the vehicle.

8. The system for dynamically braking a vehicle closure according to claim 1, wherein the vehicle closure position sensor is one of a rotary flex shaft encoder, a Hall Effect sensor, and an angle sensor.

9. A method for dynamically braking a vehicle closure of a vehicle, comprising:
generating a generated drive signal by a drive mechanism under mechanical force of kinetic energy from the vehicle closure during at least a portion of the operation of the vehicle closure from an open position to a close position; and
feeding back the generated drive signal to the drive mechanism for dynamic braking of the vehicle closure during the at least a portion of the operation of the vehicle closure from the open position to the close position.

10. The method for dynamically braking a vehicle closure according to claim 9, further comprising:
determining a speed of the vehicle closure relative to the vehicle.

11. The method for dynamically braking a vehicle closure according to claim 10, wherein feeding back the generated drive signal further comprises:
pulse width modulating the generated drive signal to the drive mechanism.

12. The method for dynamically braking a vehicle closure according to claim 11, wherein pulse width modulating the generated drive signal to the drive mechanism further comprises:
increasing the pulse width modulation generated drive signal to increase the dynamic braking and decrease the speed of the vehicle closure.

13. The method for dynamically braking a vehicle closure according to claim 11, wherein pulse width modulating the generated drive signal to the drive mechanism further comprises:
decreasing the pulse width modulation generated drive signal to decrease the dynamic braking and increase the speed of the vehicle closure.

14. The method for dynamically braking a vehicle closure according to claim 9, wherein pulse width modulating the generated drive signal to the drive mechanism further comprises:
decreasing the pulse width modulation generated drive signal to decrease the dynamic braking and increase the speed of the vehicle closure.

15. A vehicle having a vehicle closure, comprising:
a vehicle body, the vehicle closure being operably mounted to the vehicle body to enable the vehicle closure to move between an open and a closed position;
a drive mechanism operably mounted to the vehicle and the vehicle closure, the drive mechanism having electrical contacts to receive a drive signal to cause the drive mechanism to move the vehicle closure between the open and the close position in response to the drive signal, the drive mechanism capable of generating a generated drive signal during at least a portion of the operation of the vehicle closure from the open to the close position; and
a controller having electrical outputs electrically coupled to the electrical contacts of the drive mechanism and electrical inputs to provide the drive signals to the drive mechanism and to receive generated drive signals from the drive mechanism, the controller further configured to provide the generated drive signals back to the drive mechanism during operation of the vehicle closure to provide dynamic braking of the vehicle closure from the open to the close position.

16. The vehicle having a vehicle closure according to claim 15, wherein the drive mechanism is a motor capable of generating drive signals during the operation of the vehicle closure from the open to the close position.

17. The vehicle having a vehicle closure according to claim 15, wherein the controller further comprises:
a circuit board having a plurality of microcontrollers for controlling the drive mechanism between one of an open position, a close position, a freewheeling operation, and the dynamic braking operation.

18. The vehicle having a vehicle closure according to claim 15, wherein the controller further comprises:
a processor executing a software program that alters the generated drive signal in response to the closing velocity of the vehicle closure.

19. The vehicle having a vehicle closure according to claim 18, wherein the software program is configured to determine when to apply a generated drive signal to the drive mechanism based on the closing velocity of the vehicle closure.

20. The vehicle having a vehicle closure according to claim 19, wherein the software program is further configured to provide a generated drive signal generated by the drive mechanism back to the drive mechanism during the operation of the vehicle closure from the open to the close position.

21. A controller for dynamically braking a vehicle closure, comprising:
a processor configured receive a control signal representative of a closing velocity of the vehicle closure, the processor configured to receive a generated drive signal from a drive mechanism controlling the vehicle closure;
software executable by the processor, the software configured to generate a pulse width modulation generated drive signal in response to the generated drive signal; and an input/output unit configured to communicate the pulse width modulation generated drive signal to the drive mechanism for providing dynamic braking to the vehicle closure.

22. The controller for dynamically braking a vehicle closure according to claim 21, wherein the controller further comprises:
a first microcontroller circuit operable between an on position and an off position, the first microcontroller circuit in contact with a power source for providing an opening drive signal to the drive mechanism.

23. The controller for dynamically braking a vehicle closure according to claim 21, wherein the controller further comprises:
a second microcontroller circuit operable between an on position and an off position, the second microcontroller circuit in contact with the power source for providing a closing drive signal to the drive mechanism.

24. The controller for dynamically braking a vehicle closure according to claim 21, wherein the controller further comprises:
a third microcontroller circuit operable between an on position and an off position, the third microcontroller circuit for providing the pulse width modulation generated drive signals.

25. The controller for dynamically braking a vehicle closure according to claim 21, wherein the controller further comprises:
a fourth microcontroller circuit operable between an on position and an off position, the fourth microcontroller circuit in contact with the controller for providing the dynamic braking to the vehicle closure.

26. The system for dynamically braking a vehicle closure according to claim 2, wherein the generated drive signal is electrical energy, the generated drive signal responsive to the kinetic force of the vehicle closure.

27. The system for dynamically braking a vehicle closure according to claim 26, wherein the electrical energy is fed back the system to power the system during the dynamic braking.

* * * * *